United States Patent [19]

Mikami

[11] 3,857,644

[45] Dec. 31, 1974

[54] SHAFT MOUNTING APPARATUS

[75] Inventor: Yasushi Mikami, Soma, Japan

[73] Assignee: Alps Electric Co., Ltd., Tokyo, Japan

[22] Filed: Oct. 3, 1973

[21] Appl. No.: 403,079

[30] Foreign Application Priority Data
Nov. 1, 1972  Japan............................ 47-125418

[52] U.S. Cl. ............................................... 403/196
[51] Int. Cl............................................. F16b 11/00
[58] Field of Search ........... 403/194, 196, 197, 243,
403/256, 263, 331, 327; 308/135; 74/504

[56] References Cited
UNITED STATES PATENTS
383,977   6/1888   O'Leary............................. 308/135
2,238,302 4/1941   Bahmbach.......................... 403/263

Primary Examiner—Benjamin W. Wyche
Assistant Examiner—Wesley S. Ratliff, Jr.

[57] ABSTRACT

Apparatus for mounting a rotary shaft to a component frame having a slot therein. The apparatus includes a cylindrical bearing member in which the rotary shaft is rotatably received. A circumferential groove forms a neck portion in the rotary shaft which is aligned with a pair of notches formed in the bearing member when the shaft is received in the member. The notches are separated by upper and lower bridge portions and shaped to receive opposing edges of the slot to permit passage thereof into the groove to maintain axial alignment between the shaft and frame. The lower bridge portion formed between the notches rests on the bottom of the slot when the member is received therein. The upper bridge portion is disposed between the opposing edges of the slot to prevent rotation of the member relative to the slot. A retaining spring is disposed in direct contact with the bearing member to retain the member and therefore the shaft in proper transverse position relative to the slot without exerting any force directly on the shaft thus permitting rotation of the shaft with minimum frictional resistance.

8 Claims, 6 Drawing Figures

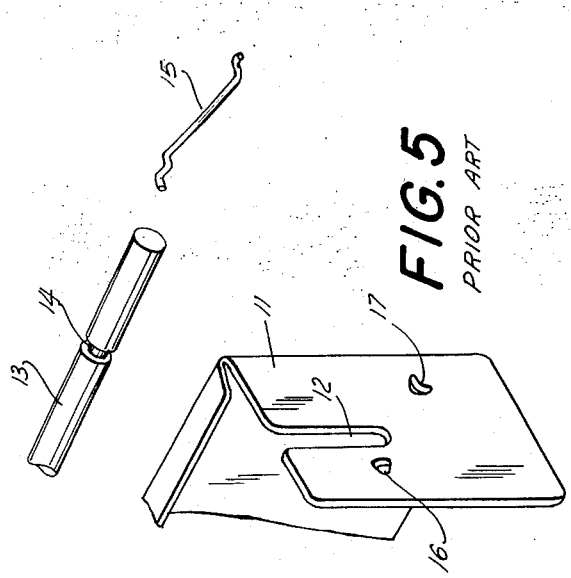
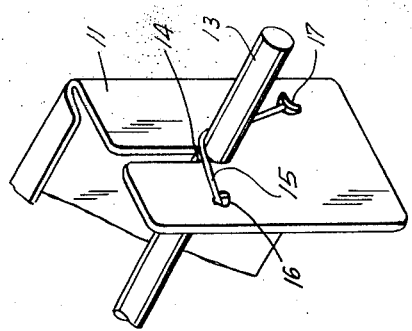
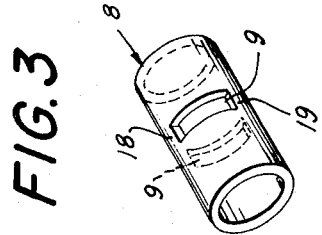
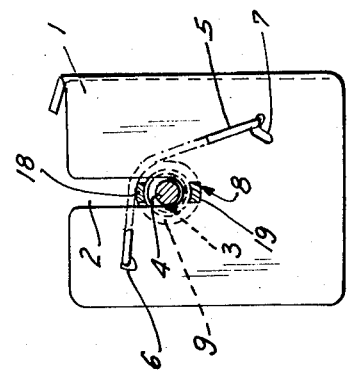
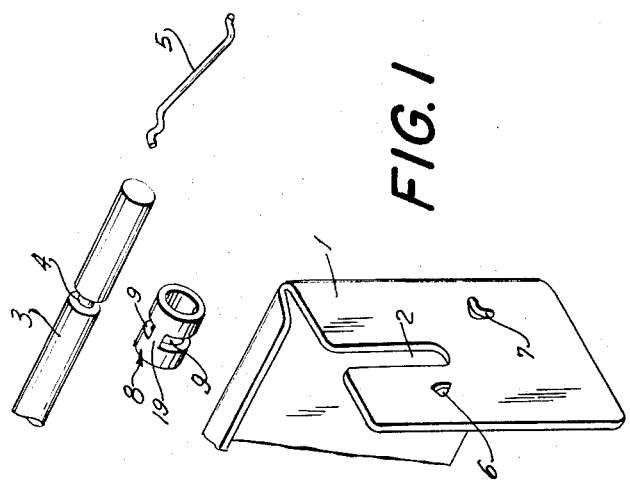
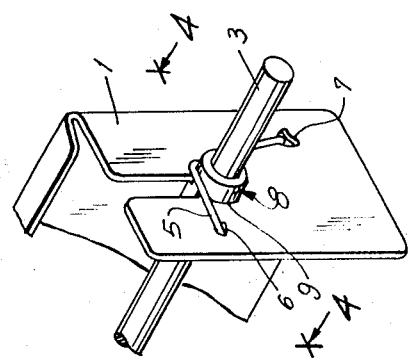

3,857,644

SHAFT MOUNTING APPARATUS

This invention relates to shaft mounting apparatus and more particularly to apparatus for mounting a rotary shaft, such as the channel selector shaft, to the frame of an electric component, such as a television or radio receiver.

Conventional shaft mounting mechanisms include, as hereinafter described, a retaining spring which is in direct contact with a rotary shaft to be secured. Because of the direct force of the spring on the shaft, the shaft is pressed against the frame causing disadvantageous effects, including excessive resistance due to friction between the frame and shaft as the shaft rotates, which in turn causes wearing away of the shaft. Moreover, poor stability and reduction of tuning accuracy are often present in these prior art devices.

It is therefore, a prime object of the present invention to provide shaft mounting apparatus of simple structure and low cost in which no load force is imposed directly upon the mounted rotary shaft by the retaining spring, and which permits a high degree of freedom in determining the relative axial position of the rotary shaft with respect to the frame.

It is another object of the present invention to provide shaft mounting apparatus of the above type which is devoid of the drawbacks of the conventional mounting mechanism described above and effective for use in electric components such as television and radio tuners.

In accordance with the present invention, shaft mounting apparatus is provided for mounting a rotary shaft of a component to the frame thereof. The rotary shaft is provided with a circumferential groove defining a neck portion, and the component from is formed with a slot, preferably rounded at one end. A hollow cylindrical bearing member adopted to rotatably receive the rotary shaft is provided with a pair of notches formed to align with the neck portion of the shaft when it is received within the member. Connecting the notches on the top and bottom of the bearing member are a pair of bridge portions. A retaining spring, the ends of which are mounted to the frame, is employed to exert a force on the bearing member to prevent transverse movement between the rotary shaft and the slot.

The bearing member and inserted rotary shaft are positioned in the rounded end portion of the slot with the neck portion of the shaft aligned with the notches of the member. The lower bridge portion rests on the bottom of the slot to transmit the load from the retaining spring to the frame. Opposing edges of the slot pass through the notches into the groove to prevent axial movement between the shaft and frame. The upper bridge portion lodges between opposing edges of the slot to prevent rotation of the member relative to the frame. Since the spring places no load on the shaft itself, frictional resistance to shaft rotation is minimized.

To the accomplishment of the above and to such other objects as they may hereinafter appear, the present invention relates to shaft mounting apparatus, as defined in the appended claims and as described in the specification, taken together with the accompanying drawings wherein like numerals refer to like parts and in which:

FIG. 1 is an exploded perspective view of the preferred embodiment of the shaft mounting apparatus according to the present invention;

FIG. 2 is a perspective view of the apparatus of FIG. 1 in an assembled state;

FIG. 3 is a perspective view of the bearing member of the present invention;

FIG. 4 is a cross-sectional view, taken along the line 4—4 of FIG. 2, of the present invention in the assembled state;

FIG. 5 is an exploded perspective view of a conventinal shaft mounting mechanism; and FIG. 6 is a perspective view of the prior art mechanism of FIG. 5 in an assembled state.

FIGS. 5 and 6 show a conventional shaft mounting mechanism such as is currently being used in television recievers or the like. The typical structure of this prior art mechanism will be explained in order to facilitate understanding of the present invention and its effectiveness.

As shown in FIGS. 5 and 6, the end wall 11 of the frame of the electric component or structure (not shown) is provided with a shaft guide slot 12 having a rounded lower end and tangs or holes 16 and 17 for mounting the ends of a retaining spring 15. The rotary shaft 13 to be mounted on frame 11 has a circumferential groove 14 formed thereon defining a neck portion. As shown in FIG. 6, the rotary shaft 13 is held in place by inserting the groove 14 of the shaft 13 into slot 12 formed in the frame 11 until it rests within the lower rounded end thereof. Spring 15, whose ends are secured at tangs or holes 16 and 17, retains the shaft in this position by exerting force on shaft 13.

In this mechanism, in order to eliminate the "play" between the rotary shaft and the frame, it is necessary to increase the retaining force of the spring, and as the force is increased the force exerted by shaft 13 on frame 11 increases and therefore resistance due to the friction between the shaft and frame increases. As a result, the amount of wear at the portions of frame 11 contacting the rotary shaft 13 at groove 14 increases markedly, aggravating problems relative to operational character and life span of the mechanism.

Specifically, where such a mechanism is used as the channel selector shaft of a television receiver, it is necessary to impart sufficient holding and clasping force on the shaft in order to maintain the stability of the television picture and to protect it from being influenced by channel changeover noise. However, the increased resistance on the shaft resulting from the large biasing force applied thereto causes detrimental effects upon the torque, accuracy of channel selection and resettability of the shaft, as the shaft is rotated. Thus, it was impossible to meet all the required conditions and, commonly, mechanisms were produced through trial and error processing steps so as to satisfy certain of the design requirements or at least to achieve a workable compromise between them.

Further, in the mechanisms of the prior art, operational stability of the rotary shaft was provided only by engagement of the retaining spring with the shaft groove, so only comparatively limited accuracy and useful life could be provided.

The present invention has overcome the foregoing disadvantages inherent in conventional mechanisms by including a bearing member in contact with the retaining spring to position the shaft without applying any load force on the shaft itself, and in particular without adding any frictional resistance to shaft rotation by reason of the exerted retaining force.

A preferred embodiment of the present invention is shown in FIGS. 1 through 4. As shown in these drawings, an end wall 1 of a component frame is provided with a shaft guide slot 2, preferably having a rounded lower end. Tangs or holes 6 and 7 for mounting ends of a retaining spring 5 are provided on end wall 1. The rotary shaft 3 has a circumferential groove 4 defining a neck portion therein. The groove 4 is dimensioned so as to fit snugly in the slot 2 formed in the frame 1. As thus far described, the construction is conventional.

In accordance with the present invention the hollow cylindrical shaped bearing member 8 is provided, formed with a pair of notches 9 therein. Notches 9 preferably have a width corresponding to the thickness of the edges of groove 4 formed in the rotary shaft 3. Upper and lower bridge portions 18 and 19, respectively separate notches 9 and preferably have a length substantially equal to the distance between the opposing edges of slot 2. The inner diameter of the bearing member 8 is dimensioned so that the rotary shaft 3 is freely rotatably receivable therein.

In assembling, the rotary shaft 3 is received in the bearing member 8, and shaft groove 4 is aligned with the notches 9, as shown in FIG. 2. Member 8 is then inserted into slot 2 such that lower bridge portion 19 rests on the rounded portion of slot 2 and opposing edges of slot 2 pass through notches 9 and into groove 4. This prevents any axial movement between the shaft 3 and the frame 1. Upper bridge 18 lodges between the opposing edges of slot 2, thus preventing rotation of member 8 relative to frame 1. Preferably, the width of notches 9 and the groove 4 correspond to the thickness of the edges of slot 2. Retaining spring 5, when mounted on the end wall, contacts member 8 at a point axially displaced from the notches 9, thus exerting a downward force on member 8, retaining it in place. The force from spring 5 is transmitted to end wall 1 by lower bridge portion 19 and is not exerted on shaft 3 only via member 8. Hence shaft 3 remains freely rotatable in member 8 while being retained in proper position relative to the frame and wall 1.

As described in the preferred form, the present invention is constructed so that the load caused by the bias spring 5 is not present on shaft 3 but is applied to bearing member 8 only. This configuration minimizes frictional resistance between the shaft and the frame as the shaft is rotated while maintaining the position of the shaft relative to the frame. The present invention provides the advantages of smooth rotation, long useful life of the rotary shaft, enhanced torque properties, sharpness of tuning and resettability of channel selection, and permits simple, accurate axial positioning of the rotary shaft with respect to the frame.

A single preferred embodiment of the present invention has been specifically disclosed herein for purposes of illustration. It is apparent that many variations and modifications may be made upon the specific structure disclosed herein. It is intended to cover all of these variations and modifications which fall within the scope of this invention as defined by the appended claims.

I claim:

1. Apparatus for mounting a rotary shaft to a frame wherein the shaft is provided with a circumferential groove defining a neck portion and the frame is provided with a slot therein, said apparatus comprising a hollow cylindrical bearing member adapted to rotatably receive the shaft therein and having a pair of notches separated by a bridge portion, said notches adapted to be aligned with the neck portion of the shaft when the shaft is received within said member, said member being adapted to be inserted into said slot with said bridge portion resting on the bottom of the slot and opposing edges of the slot extending through said notches into said groove, and a retaining spring mounted on the frame and containing said member to maintain the position of said member within said slot.

2. The apparatus of claim 1 wherein the width of each of said notches is substantially equal to the thickness of the edges of the slot.

3. The apparatus of claim 1 wherein the width of said bridge portion is substantially equal to the distance between opposing edges of the slot.

4. The apparatus of claim 1 further comprising a second bridge portion situated in diametrically opposed relation to the first bridge portion and located at an upper portion of said slot when said member is inserted into said slot.

5. The apparatus of claim 1 wherein said notches pass through said member such that the edges of said slot may be received therein.

6. The apparatus of claim 1 wherein said spring contacts said member at a point axially displaced from said notches.

7. The apparatus of claim 1 further comprising a second bridge portion situated in diametrically opposed relation to said first bridge portion, the width of said bridge portion being substantially equal to the distance between opposing edges of the slot.

8. Apparatus for mounting a rotary shaft to a frame having a slot therein comprising a rotary shaft, said shaft having a circumferential groove defining a neck portion, a hollow cylindrical bearing member adapted to rotatably receive the shaft therein and having a pair of notches separated by a bridge portion, said notches adapted to be aligned with the neck portion of the shaft when the shaft is received within said member, said member being adapted to be inserted into said slot with said bridge portion resting on the bottom of the slot and opposing edges of the slot extending through said notches into said groove, and a retaining spring mounted on the frame and containing said member to maintain the position of said member within said slot.

* * * * *